United States Patent
Schmidt et al.

(10) Patent No.: US 9,347,591 B2
(45) Date of Patent: May 24, 2016

(54) STATIC DISSIPATION IN COMPOSITE STRUCTURAL COMPONENTS

(75) Inventors: Kyle Warren Schmidt, Bellingham, WA (US); Randal Joseph Rapoza, Bellingham, WA (US); Brian Gene Thompson, Bellingham, WA (US); Edwin Hall Niccolls, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 439 days.

(21) Appl. No.: 13/559,706

(22) Filed: Jul. 27, 2012

(65) Prior Publication Data
US 2013/0036604 A1 Feb. 14, 2013

Related U.S. Application Data

(60) Provisional application No. 61/522,822, filed on Aug. 12, 2011.

(51) Int. Cl.
*H01R 43/00* (2006.01)
*F16L 13/10* (2006.01)
(Continued)

(52) U.S. Cl.
CPC .............. *F16L 13/103* (2013.01); *F16L 25/01* (2013.01); *F16L 58/1009* (2013.01); *H01R 4/60* (2013.01); *Y10T 29/49117* (2015.01)

(58) Field of Classification Search
CPC ....... F16L 25/01; F16L 25/04; F16L 58/1009; F16L 11/16; F16L 2011/047; H01R 4/60; Y10T 29/49124; Y10T 29/49002; Y10T 29/49
USPC ......... 29/825, 592.1, 592; 138/103, 131, 132, 138/133, 134, 138, 139; 174/47
See application file for complete search history.

(56) References Cited

U.S. PATENT DOCUMENTS

| 3,753,205 A | * | 8/1973 | Tuger | F16L 25/01 174/78 |
|---|---|---|---|---|
| 4,675,780 A | | 6/1987 | Barnes et al. | |

(Continued)

FOREIGN PATENT DOCUMENTS

JP  2003-278959  10/2003

OTHER PUBLICATIONS

U.S. Appl. No. 13/559,693, filed Jul. 27, 2012, Niccolls, et al.
(Continued)

*Primary Examiner* — Peter DungBa Vo
*Assistant Examiner* — Azm Parvez
(74) *Attorney, Agent, or Firm* — Melissa Patangia

(57) ABSTRACT

A method to prevent the accumulation of static electricity in a pipe system for containing corrosive petroleum products is provided, for a total resistance of less than 1 MEG ohms to ground from all points. The pipe system has at least two pipe sections, each comprising a structural layer and a corrosion resistant layer. The corrosion resistant layer has at least a conductive surface area in contact with the fluid, with the conductive surface area defining an electrical pathway extending a length of the pipe section. Each pipe section has a tapered end exposing a portion of the corrosion resistant layer. The method comprises joining the two pipe sections at the tapered ends by a conductive adhesive overlay, and electrically connecting the conductive adhesive overlay to a grounding device, wherein the grounding device helps dissipate build-up of electrostatic charge in the pipe system carrying the fluid.

17 Claims, 1 Drawing Sheet

(51) Int. Cl.
  *F16L 58/10*  (2006.01)
  *F16L 25/01*  (2006.01)
  *H01R 4/60*   (2006.01)

(56) References Cited

U.S. PATENT DOCUMENTS

| | | | |
|---|---|---|---|
| 5,524,673 | A | 6/1996 | Noone et al. |
| 5,785,092 | A | 7/1998 | Friedrich et al. |
| 5,799,705 | A | 9/1998 | Friedrich et al. |
| 5,951,812 | A * | 9/1999 | Gilchrist, Jr. ....... B29C 65/4855 156/304.2 |
| 6,093,615 | A | 7/2000 | Schuele et al. |
| 6,401,767 | B1 | 6/2002 | Cohen et al. |
| 6,498,291 | B2 | 12/2002 | Brammer |
| 6,585,298 | B2 | 7/2003 | Palsson |
| 6,965,079 | B2 | 11/2005 | Westberry |
| 7,093,860 | B2 | 8/2006 | Fawley |
| 7,117,944 | B2 | 10/2006 | Boyadjieff |
| 7,656,642 | B2 | 2/2010 | Ulekleiv et al. |
| 2003/0099796 | A1 | 5/2003 | Levi |
| 2006/0099843 | A1 * | 5/2006 | Fullner ................ F16L 25/02 439/275 |
| 2007/0261752 | A1 | 11/2007 | McClung et al. |
| 2007/0281122 | A1 | 12/2007 | Blanchard et al. |
| 2008/0176018 | A1 | 7/2008 | Enniss et al. |
| 2010/0116941 | A1 | 5/2010 | Ciolcyzk et al. |
| 2010/0175315 | A1 * | 7/2010 | McRobbie ............. C10L 1/143 44/603 |
| 2010/0263761 | A1 | 10/2010 | Niccolls et al. |
| 2010/0266788 | A1 | 10/2010 | Niccolls et al. |
| 2010/0310851 | A1 | 12/2010 | Lai et al. |
| 2011/0036490 | A1 | 2/2011 | Mamish |

OTHER PUBLICATIONS

Notification of Transmittal of the International Search Report; International Application No. PCT/US2012/048508; dated Feb. 6, 2013 (3 pages).

* cited by examiner

STATIC DISSIPATION IN COMPOSITE STRUCTURAL COMPONENTS

CROSS-REFERENCE TO RELATED APPLICATIONS

This application claims benefit under 35 USC 119 of U.S. Provisional Patent Application No. 61/522,822 with a filing date of Aug. 12, 2011. This application claims priority to and benefits from the foregoing, the disclosure of which is incorporated herein by reference.

TECHNICAL FIELD

The invention relates to static charge dissipating structural components, including composite pipes, and methods for joining composite components as to promote static dissipation.

BACKGROUND

Electrostatic or static charges can be generated both on the inside and outside of structural components such as pipes, vessels, etc. One source of static charge generation and accumulation results from the flow of fluids with conductivities of less than 10,000 pS/m inside non-conducting structural components. Static discharges can occur inside equipment such as insulating pipes, so counter-measures are necessary when operating a pipe that is only partially filled and may contain a flammable vapor. Static charge accumulation can also give rise to external discharges, potentially igniting a flammable atmosphere in the region surrounding the equipment.

Petroleum products typically contain or have associated with them corrosive materials such as carbon dioxide, hydrogen sulfide, and chlorides, etc. In composite pipe systems, there is a continuous resin rich reinforced corrosion liner that isolates process fluids from the structural wall, preventing lead prone penetration through the structure. Because composite materials provide improved corrosion resistance and reduced maintenance requirements, they have been employed as replacement of expensive steels and alloys in the containment of petroleum products. In pipelines conveying petroleum products, static charges accumulate at the fluid-pipe wall interface.

There is a need for an improved method to dissipate static charges generated in structural components for use in containing/conveying petroleum products, particularly piping systems comprising composite materials for improved corrosion resistant properties. There is also the need for an improved method to join composite pipes while maintaining conductivity for use in the oil & gas industry.

SUMMARY OF THE INVENTION

In one aspect, a pipe system for containing fluids such as corrosive petroleum products, having conductivity of less than 10,000 pS/m is provided. The pipe system has at least two pipe sections, each comprising a structural layer and a corrosion resistant layer. The corrosion resistant layer has at least a conductive surface area in contact with the fluid, with the conductive surface area defining an electrical pathway extending a portion of the length of the pipe structure. Each pipe section has a tapered end exposing a portion of the corrosion resistant/conductive layer. The two pipe sections are joined at the tapered ends by a conductive adhesive overlay. The conductive adhesive overlay is electrically connected to a grounding device, wherein the grounding device helps dissipate build-up of electrostatic charge in the pipe system carrying the fluid, for a total resistance to ground of less than one MEG OHM ($10^6$ ohms) from all points throughout the system.

In a second aspect, a method to dissipate static build-up from a joint area in the system in a composite structural component system is provided. The system is for carrying a fluid having conductivity of less than 10,000 pS/m. The method comprising a number of steps, including providing two structural components with each component comprising a structural layer and a corrosion resistant layer in contact with the fluid. Each corrosion resistant layer has at least a conductive surface area to provide an electrical pathway that extends along at least a portion of the length of the section. In the next step, the joint end on each structural component is prepared by exposing a portion of the conductive corrosion resistant layer. The joint ends are aligned in an abutting relationship, then a conductive layer is applied to the joint ends in contact with the conductive corrosion liner. A grounding device is installed on at least one of the structural components for the grounding device to be in electrical communication with the conductive layer, dissipating static energy build-up by the fluid in the system for a total resistance to ground of less than $10^6$ ohms.

DETAILED DESCRIPTION

Figure 1:
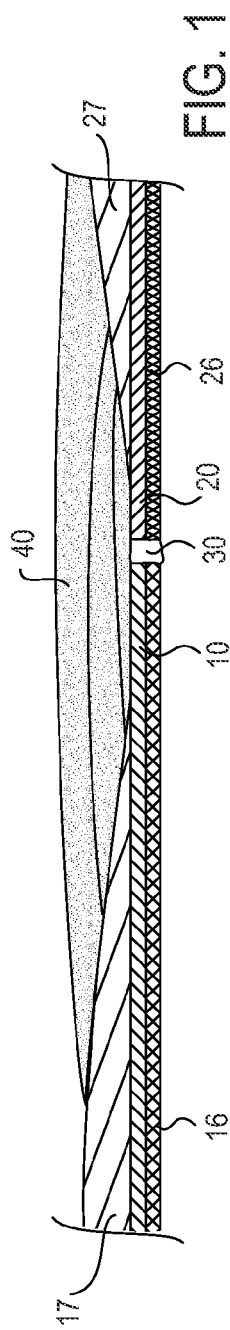
FIG. 1 is a side view of a butt-wrap joint.

The following terms will be used throughout the specification and will have the following meanings unless otherwise indicated.

"Petroleum products" refer to natural gas; natural and synthetic liquid hydrocarbon products including but not limited to biodegraded oils, crude oils, refined products including gasoline, other fuels, and solvents; and semi-solid/solid hydrocarbon products including but not limited to tar sand, bitumen, etc.

"Structural components" refer to pipelines, a pipe system, tubings, vessels, reactors, transfer lines, process piping, processing equipment including but not limited to distillation columns, and the like. In one embodiment, the structural component is a section of pipe for transporting petroleum products.

"Structural layer" refers to a layer that creates or provides the structural support for a structural component.

"Corrosion resistant layer" refers to the layer of the structural component that is in contact with the petroleum product. The corrosion resistant layer serves to decrease and/or mitigate general corrosion and erosion corrosion by the petroleum product contained within.

"Contain" (or containing, or containment) means being used in an environment wherein petroleum products are employed or in contact with petroleum products, which includes the transport, processing, handling, storage, shipping, and containment of petroleum products, whether on a continuous, incidental, or intermittent basis.

"Thickness" refers to the average thickness of a layer or layers of a material.

"Composite" material refers to an engineered material made from two or more constituent materials with different physical or chemical properties and which remain separate and distinct on a macroscopic level within the finished structure. In one embodiment, the composite layer comprises a fiber material in a matrix, e.g., a fiber-reinforced plastic composite material, a fiber reinforced resin, glass-reinforced plastic or GRP, a fiber-reinforced ceramic matrix composite material, a glass fiber material in a glass ceramic composite, etc.

A reference to "pipe," "pipe system," or "piping system" is by way of exemplification of a structural component, and not intended to exclude other forms or shapes such as vessels or pipe components such as elbows, tees, reducers, etc.

A reference to "fluids of low conductivity" refers to fluids having conductivities of less than 10,000 pS/m in one embodiment, less than 5,000 pS/m in a second embodiment, and less than 1,000 pS/m in a second embodiment.

The invention relates to pipe systems for containing or carrying fluids of low conductivity such as petroleum products, including the dissipation of static electricity charged generated both on the inside and the outside of the pipes, and particularly the coupling or joint between adjacent pieces of composite equipment, e.g., pipe sections or components such as elbows, reducers, etc. In one embodiment, the invention relates to a composite system designed such that continuity is maintained across the connecting joints, with at least a connection to ground at selected joints. In another embodiment of a pipe system the joints are designed for sufficient circumferential burst and longitudinal strength that is at least as, and preferably more than, the principal strength of the pipe.

In one embodiment, each piece of structural component, e.g., a composite pipe section, is characterized as having a multilayered structure, with the structural layer comprising a composite material, and the innermost layer in contact with the fluid being contained within is a corrosive-resistant layer having a conductive surface area, forming an electrical pathway for static dissipation. In one embodiment, the composite pipe further comprises a fire protection layer on top of the structural layer, e.g., a metallic/non-insulating fire protective sheathing (collar), an intumescent coating layer, an insulation layer, or combinations thereof.

Structural Layer:

The structural layer provides the structural integrity for the composite structural component. It can be a substrate or supporting layer for the corrosion resistant layer and/or other additional layers including a fire resistive layer and/or collar. In one embodiment, the structural layer comprises at least a composite layer as disclosed in US Patent Publication No. US20100266788A1, or a fire resistant layer as disclosed in U.S. Pat. No. 5,799,705, the relevant disclosures are included herein by reference. The structural layer can be formed of one or more layers of composite materials, wherein the layers can be of the same or different composite materials.

In one embodiment the composite material can be formed of one or more plies, with each ply having one or more fibers distributed within a matrix, comprising of resin, ceramic material, or polymer material. In one embodiment, the matrix material is a resin material, e.g., thermoplastic or thermoset resin. Examples of resin materials include but are not limited to phenolic resins, epoxy resins, cyanate ester, phenolic/polyester blend, silicone, phthalonitrile, vinyl ester, siloxane-modified phenolic resins, furan resins, and mixtures thereof. In one embodiment, the reinforcing fibers comprise structural fibers and/or flexible yarn. The structural fibers may be formed of carbon, nylon, polyester, aramid, thermoplastic, glass, or other suitable fiber materials. In another embodiment, the composite material comprises a ceramic material as the reinforcing fibers.

Corrosion Resistant/Conductive Layer:

In one embodiment, the structural layer itself also functions as the corrosion resistant/conductive layer with the addition of conductive elements to the composite, for a conductive surface area in contact with the fluid being transported in the pipe. In another embodiment, conductive elements are added to a corrosion resistant layer is as described in US Patent Publication No. US20100266788A1 for a conductive surface area, the relevant disclosures are included herein by reference.

In one embodiment, a conductive strip runs along at least a portion of the pipe section and made integral with the structural layer or the corrosion resistant layer in contact with the fluid being transported in the pipe, for providing a conductive path. In one embodiment, the conductive strip runs over 50% the length of the pipe section. In another embodiment, the conductive strip runs over 75% the length of the pipe section. In a third embodiment, over the entire length of the pipe section. In one embodiment for section pieces such as tees, reducers, etc., the conductive strip runs from one end to another of the piece, e.g., from one end opening to the other end opening(s) for a tee section.

In one embodiment, conductive elements selected from the group of graphite, carbon black, metal oxides such as tin oxide, nano-particles of antimony doped tin oxide, etc, are added to the resin matrix constituting the conductive corrosion resistant layer. In one embodiment, the conductive elements are porous carbon particles. In another embodiment, other porous metallic particles can be used, e.g., silver, etc. In one embodiment, the structural layer contains conductive fibers distributed within a matrix, e.g., with carbon fiber towed in with the fiberglass, forming a grid pattern with the carbon fibers contacting each other providing through-the-wall conductivity as well as end-to-end conductivity. In yet another embodiment, the corrosion-resistant layer comprises conductive fiber glass strands as disclosed in US Patent Publication No. 20100310851A1, which disclosure is incorporated by reference in its entirety. In another embodiment, the conductive element is an ionic conductive agent such as $NaClO_4$ or other commercially available ionic conductive agents, e.g., Irgastat™ additives from Ciba Specialty Chemicals Inc., or Pelestat™ additives from Sanyo Chemical Industries, Ltd.

The amount of conductive elements in the resin and/or fiber matrix varies depends on a number of factors, e.g., the type of conductive elements employed, the properties of the resin matrix, the type of the fiber strands, the type of fluid to be contained within the equipment and its conductivity, etc. In one embodiment, the amount of conductive elements ranges from 5 to 30 wt. % of the resin matrix in the conductive layer. In one embodiment, the amount of graphite as conductive elements in a composite laminate ranges from 20 to 25 wt. % for a resistance ranging from about 1500 ohms/ft to about 7500 ohms/ft. The resistance of a laminate comprising a carbon veil without any graphite addition is about 50,000 ohms/ft.

The thickness of the corrosion resistant layer with a conductive surface area varies depending on the construction materials as well as the size of the equipment. In one embodiment, the layer has a thickness ranging from 0.5 to 25 mm. In another embodiment, from 1 to 15 mm. In a third embodiment, from 2 to 10 mm. In a fourth embodiment, at least 20 mm thick. In one embodiment, the conductive corrosion resistant layer has a minimum thickness of 100 mils, comprising 1 ply of 10 mil nominal thickness carbon fiber veil and at least 2 plies of 1½ oz./ft² ECR or E glass-chopped strand mat.

In one embodiment with the provision of at least a conductive strip integral with the corrosion resistant layer, the strip can be made integral with the layer by extrusion. In another embodiment, carbon fiber or tow is intertwined with the fiberglass, e.g., by weaving, forming a conductive strip along the pipe length (or the height of a composite vessel). In one embodiment, the conductive strip is at least 20 mm wide. In another embodiment, the conductive strip measures 5 to 30 mm in width. In yet another embodiment, the conductive strip has a thickness ranging from 0.1 to 10 mm, running along the length of the pipe section.

In one embodiment, the corrosion resistant layer comprises a plurality of layers wherein the layers can be the same or different materials, e.g., the innermost layer(s) in contact with the fluid comprising a carbon-fiber reinforced composite for its conductivity, with the outer layers comprising glass-fiber reinforced composite material(s). In one embodiment, the layers are permanently bonded together by intermediate adhesive layers. In another embodiment, the layers may be heated to enhance the adhesion and/or embedding of the layers into one another.

Grounding Devices:

The structural component system is provided with a plurality of grounding devices, e.g., conductive components, strategically or selectively placed to provide a grounding path from the fluid through the conductive corrosion resistant layer, the joint between the sections, to a ground source. The grounding devices can be in various forms known in the art, e.g., ground lugs, nuts, and the like, securely bonded or connected the pipe system. The number of ground devices depend on a number of factors including but not limited to the type of devices employed, the desired spacing between the devices, allowable distance to ground and convenience to a grounding location.

In one embodiment, the grounding devices are integrally mounted on the conductive overlay for a conductively grounded overlay. In another embodiment, at least some of the devices are mounted on the composite structural components and connected to the conductive overlay via electrical wires or cables. In a third embodiment, the grounding devices are mounted on a protective sheath (collar) housing the pipe sections, and the devices are connected to the conductive overlay via wires or cables. In one embodiment for a large piece of equipment, there can be multiple grounding devices for each connective joint with the grounding devices being positioned along the circumferential conductive joint of two pipe sections.

Method for Forming:

In one exemplary method, two structural components are provided, e.g., two pipe sections or a section of pipe and a connecting section piece such as an elbow, in an abutting relationship or overlapping relationship. In one embodiment, the end sections are aligned side-by-side (abutting) for a gap of less than 0.25".

In one embodiment prior to joining, the end pieces of the sections are first exposed by means known in the art, scarfing, taper grinding, etc., so as to have a taper at the end of the section exposing the conductive corrosion resistant layer (or the conductive portion of the corrosion resistant layer). The exposed conductive section is at least ¼" in width in one embodiment, at least ½" in a second embodiment, and at least 1" in a third embodiment.

In one embodiment, a conductive sealant is applied to the joint area covering the gap between the two pipe sections and some of the exposed corrosion resistant layer of each pipe section. The conductive sealant can be applied as a bead or a rope by any known techniques, including but not limited to troweling, squeegeing, pumping from a reservoir, hand-applying, using a glue gun or other pressurized liquid dispenser, dispensing from a tube, applying as a tape, and the like, in the form of a conductive adhesive, paint, tape, spray, putty, cement, etc. In one embodiment, the conductive adhesive is a commercially available zinc-rich epoxy coating material.

After the conductive sealant is applied, at least a conductive overlay is wrapped around the tapered portions of the end sections joint area where the conductive sealant is applied. In one embodiment, the conductive overlay is wrapped directly around the joint gap without the application of the conductive sealant.

The wrapped overlay can be maintained in place by any of several mechanisms known in the art. In one embodiment, the conductive overlay is an electrically conductive adhesive tape comprising carbon fiber. In another embodiment, the conductive overlay is in the form of a metalized fabric or adhesive tape, e.g., nickel/copper metalized ripstop with a conductive pressure sensitive adhesive. In a third embodiment, the conductive overlay is wrapped around the joint with intermittent application of a conductive sealant on the overlay for bonding between the layers. In one embodiment, the conductive overlay is applied as a single layer or as multiple layers, e.g., forming a wrapping of 1 to 3" wide for a thickness of 0.05 to 0.50" thick covering the tapered ends of the two sections to be joined In a second embodiment, the overlay is wrapped around for a thickness of 0.01 to 0.25". In one embodiment, the conductive overlay has a width ranging from 1 to 10".

In one embodiment, after the first wrapping of a conductive overlay, a second conductive grounding overlay is applied. The second overlay can be of the same or different material from the first overlay. In one embodiment, the second overlay comprises an electrically conductive interwoven wire fiber in a metal mesh. In one embodiment, the second conductive overlay covers the first overlay and forming wider wrapping area, e.g., 3 to 10" wide and 0.05 to 0.25" thick. In another embodiment, the second overlay is applied length-wise (along the length of the pipe section) and in electrical connection with the first circumferentially wrapped overlay (around the pipe diameter). In yet another embodiment, the second overlay can be applied over a metal plate which can serve as a base for securing a grounding lug assembly, thus providing mechanical connection as well as a conductive path from the joint to the grounding device(s) to dissipate any static charge that may be generated within the structural component.

After the wrapping of the overlay, grounding devices can be installed. In one embodiment, the devices are secured onto the conductive grounding overlay at appropriate locations to assure resistance to ground is less than one MEG OHM ($10^6$ ohms) from all points throughout the system. In one embodiment, the grounding device is located within several inches from the joint between the sections. In one embodiment, the system is provided with a grounding lug or stud for each section of pipe. In another embodiment, the system is provided with a plurality of grounding devices at the ratio of one ground device for several pieces of equipment or pipe sections.

The number and locations of the grounding devices to be installed depend on a number of factors including the fluid to be carried, its flow rate, the type of equipment in the system, the number of fittings, valves, filters, etc., in the system as well as the laminate construction of the equipment.

Figures Illustrating Embodiments:

Reference will be made to the figures to further illustrate embodiments of the invention. The figures illustrate the invention by way of example and not by way of limitation, such as limiting the structural component and joint to sections of pipes and a joint as illustrated, or to the exact layer arrangements as illustrated.

FIG. 1 is a side view of a butt-wrap joint. In the figure, two pipe sections 10 and 20 with tapered structural layers 17 and 27 (exposing the conductive corrosion-resistant end pieces 16 and 26) are aligned side by side. Conductive putty 30 is applied in between the gap joining the two end pieces, forming a circumferential strip bridging the conductive layers for a conductive path to the fluid contained in the pipe. A conductive laminate fully wraps around the pipe joint in several layers, forming a conductive overlay 40 protecting the conductive joint 30.

Figure 2:
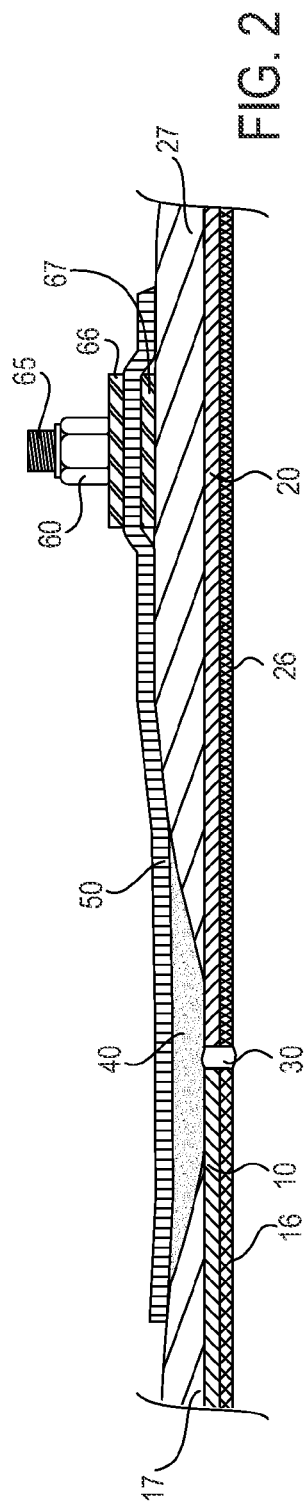
FIG. 2 is another side view of a butt-wrap joint, including a conductive overlay and grounding lug assembly.

FIG. 2 is another side view of a butt-wrap joint including a conductive overlay and grounding lug assembly. In this embodiment, a grounding lug assembly is provided for external wiring to ground (not shown). As shown, conductive grounding overlay 50 is applied over plate 67 holding it in place. Plate 66 and nut 60 allow tightening of the threaded stud 65 onto plate 67, for the ground lug assembly to be firmly installed and in contact with the conductive overlay 50 and subsequently with conductive laminate 40, conductive putty 30, and the underlying conductive corrosion resistant layers (or conductive strips) in contact with the fluid contained within.

Figure 3:
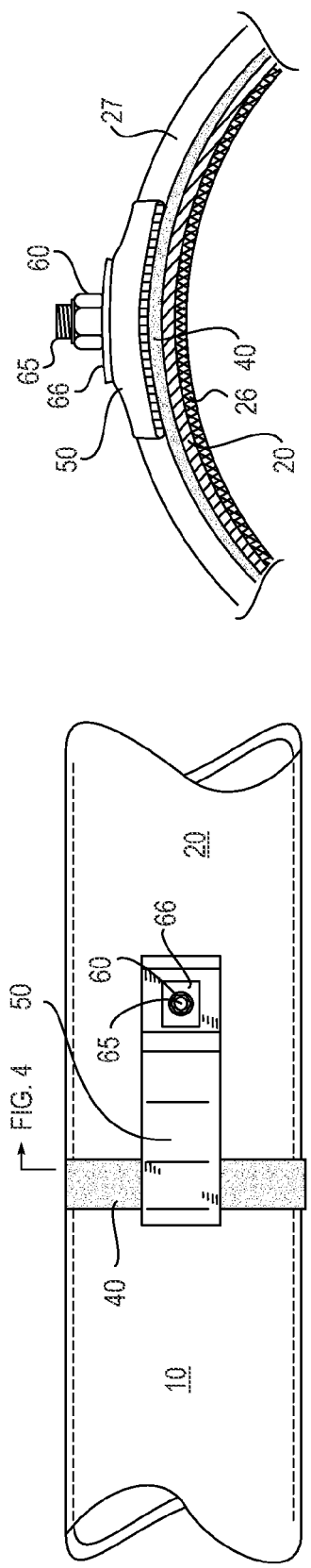
FIG. 3 is a top view of a portion of a pipe system, including a partial pipe joint and a ground lug assembly.

FIG. 3 is a top view of a portion of the joint system in FIG. 2, with a joint connecting two structural components 20 and 30, and a ground lug assembly. Conductive laminate 40 circumferentially wraps around the joint gap. Depending on the dimension of the pipe, the plates 66 and 67 can be fabricated to fit pipe curvature with threaded stud 66 and nut 65. The ground lug assembly is installed on a strip of overlay 50 in connection with the conductive laminate 40. In one embodiment, the overlay strip 50 has a width of 2 to 8", running lengthwise on the pipe and extending from several inches to several feet from conductive laminate 40. Although not shown, the joint system may further include straps, clamps, tabs, wires, etc., to attach the ground lug assembly to pipe support, housing, rack, etc. for electrically connected to ground (earth).

Figure 4:
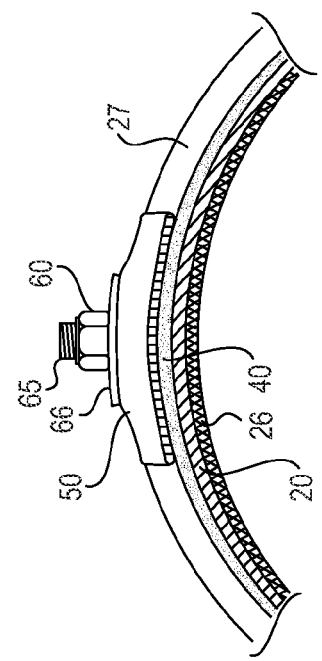
FIG. 4 is a side view of a pipe section including a ground lug assembly.

FIG. 4 is a side view of the joint system of FIG. 3, showing a section of the composite structural component 20 with a conductive corrosion resistant layer 26 and a structural layer 27. Conductive grounding overlay 50 is applied over the conductive laminate 40. Grounding lug assembly 60 is installed on the overlay 50.

Applications:

The composite system with static charge generation and dissipation joint is suitable for applications including but not limited to pipe systems for the transport and containment of corrosive petroleum products in oil and gas production. Other examples include but are but not limited to petrochemical process equipment and pipelines, transfer lines and process piping, and the like, characterized as having excellent corrosion properties, fire resistant properties, and being light and strong. A composite system with the static dissipation embodiments as described is characterized in one embodiment as having a total resistance of 1 MEG ohms or less to ground from all points throughout the system to prevent the accumulation of electricity.

Oil production, transportation, and processing applications include but are not limited to: oil and gas exploration processes, production processes including hydrocarbon extraction and oil/water/brine/gas separation, pipeline, production and refining processes, and supporting utility units including but not limited to cooling water, boiler water, and effluent treatment units.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method to dissipate static build-up in a composite structural component system carrying a fluid having conductivity of less than 10,000 pS/m from a joint area in the system, the method comprising:

providing two structural components each comprising a structural layer and a corrosion resistant layer in contact with the fluid, the corrosion resistant layer having at least a conductive surface area in contact with the fluid, the conductive surface area defining an electrical pathway that extends along at least a portion of the length of each structural component;

preparing a joint end on each structural component with each joint end having a cutback region exposing a portion of the corrosion resistant layer;

aligning the joint ends in an abutting relationship;

applying a first conductive layer to the joint ends for the first conductive layer to adhere to the cutback regions and join the structural components;

installing at least a grounding device on at least one of the structural component for the grounding device to be in electrical communication with the first conductive layer to dissipate static energy build-up by the fluid for a total resistance to ground of less than $10^6$ ohms wherein the structural components are two pipe sections, and wherein a conductive sealant is applied to the joint ends as a bead extending circumferentially around the two pipe sections for joining the pipe sections at the joint ends and wherein the fluid is a petroleum product having a conductivity of less than 1,000 pS/m.

2. The method of claim 1, farther comprising applying a second conductive layer to overlay at least a portion of the first conductive layer for the second conductive overlay to provide electrical communication between the grounding device and the first conductive overlay.

3. The method of claim 1, further comprising applying the conductive sealant to the joint ends prior to applying the first conductive layer.

4. The method of claim 1, wherein the first conductive layer is applied circumferentially around the joint ends to join the pipe sections.

5. The method of claim 4, further comprising applying a second conductive layer along at least a length of a pipe section overlaying at least a portion of the first circumferentially wrapped conductive layer to provide electrical communication between the grounding device and the first conductive overlay.

6. The method of claim 1, wherein the grounding device is a ground lug assembly comprising a nut, a stud, and two plates.

7. The method of claim 6, wherein installing the grounding device comprises integrally mounting the ground lug assembly on the second conductive layer with at least one of the two plates being positioned under the second conductive layer to provide a base for installing the ground lug assembly.

8. The method of claim 1, wherein the conductive surface area is formed from a dispersion of conductive elements in a matrix of fiber and resin.

9. The method of claim 8, wherein the conductive surface area is formed from dispersing 5 to 30 wt. % of conductive elements in a matrix of fiber and resin.

10. The method of claim 9, wherein the conductive elements are selected from the group of graphite, carbon black, metal oxides, ionic conductive agents, and mixtures thereof.

11. The method of claim 1, wherein the conductive surface area defines an electrical pathway that extends the entire length of the structural component.

12. The method of claim 1, wherein the conductive surface area defines an electrical pathway that extends at least 50% of the length of the pipe section.

13. The method of claim 1, wherein the joint end on each structural component is prepared for a cutback region of at least ¼" width to expose a portion of the corrosion resistant layer.

14. The method of claim 1, wherein the joint end on each structural component is prepared by at least one of scarfing and tape grinding for a tapered end to expose a portion of the conductive corrosion resistant layer.

15. The method of claim 1, wherein the first conductive layer that adheres to the cutback regions and joins the structural components is an electrically conductive tape comprising carbon fiber.

16. The method of claim 1, wherein the first conductive layer that adheres to the cutback regions and joins the structural components is a metalized adhesive tape.

17. The method of claim 1, wherein the first conductive layer is applied to the joint ends to form a circumferential wrapping having a width of 1 to 3" and a thickness of 0.05 to 0.50" thick to join the structural components.

* * * * *